United States Patent [19]

Bapst et al.

[11] 4,303,855
[45] Dec. 1, 1981

[54] SYSTEM FOR SEPARATING AN OPTICAL SIGNAL FROM AMBIENT LIGHT

[75] Inventors: Urs H. Bapst, Zurich; Fritz Gfeller, Adliswil; Peter Vettiger, Langnau, all of Switzerland

[73] Assignee: International Business Machines Corporation, Armonk, N.Y.

[21] Appl. No.: 101,330

[22] Filed: Dec. 6, 1979

[30] Foreign Application Priority Data

Dec. 20, 1978 [CH] Switzerland ............. 12923/78

[51] Int. Cl.³ ............................................. C01J 3/34
[52] U.S. Cl. .................................. 250/226; 455/619
[58] Field of Search ............... 250/226, 227; 455/610, 455/611, 612, 609, 619; 350/163, 164, 165, 166

[56] References Cited

U.S. PATENT DOCUMENTS

| | | | |
|---|---|---|---|
| 3,456,997 | 7/1969 | Stites et al. | 250/226 |
| 3,821,550 | 6/1974 | Priest | 250/226 |
| 4,057,352 | 11/1977 | Babb | 250/226 |
| 4,127,773 | 11/1978 | West | 250/226 |
| 4,228,349 | 10/1980 | Ettenberg et al. | 455/612 |

FOREIGN PATENT DOCUMENTS 1372633 11/1974 United Kingdom.
1469880 4/1977 United Kingdom.

OTHER PUBLICATIONS

"Spectrophotometric Noise Cancellation", by Pillus et al., IBM Tech. Disc. Bull., vol. 19, No. 6, Nov. 1976, pp. 2185-2186.
"Ambient-Light Rejection for Laser Scanners", by Soderstrom, IBM Tech. Disc. Bull., vol. 17, No. 12, May 1975, pp. 3682-3683.
"Wireless Connection Between a Controller and a Plurality of Terminals", by Closs et al., IBM Tech. Disc. Bull., vol. 20, No. 7, Dec. 1977, p. 2843.
"Infrared Detection System", by Boynton et al., IBM Tech. Disc. Bull., vol. 15, No. 5, Oct. 1972, pp. 1483-1484.

Primary Examiner—David C. Nelms
Attorney, Agent, or Firm—John B. Frisone

[57] ABSTRACT

An arrangement for separating disturbing ambient light from an optical data signal, comprising an interference filter (1), the passband of which matches the wavelength of the optical data signal, and further comprising two photodiodes which are so arranged that one photodiode receives the light ($I_S$, $I_{AT}$) transmitted through the interference filter, and that the other receives the reflected light ($I_{AR}$). Adjusting means, e.g., in the form of a settable aperture (4) or an additional simple filter (5) are provided for adjusting the transmitted and reflected portions of the ambient light to each other. Output signal (S1, S2) of both photodiodes are subtracted from each other in compensation circuitry (6). This results in compensation of the ambient light components so that at the output a signal (SR) is available which depends only on the actual data signal ($I_S$).

8 Claims, 10 Drawing Figures

SYSTEM FOR SEPARATING AN OPTICAL SIGNAL FROM AMBIENT LIGHT

FIELD OF THE INVENTION

The present invention is concerned with an arrangement for separating an optical signal of a given wavelength from ambient light, comprising an optical interference filter which has a passband matching said given wavelength of the optical signal.

Optical signals, i.e., modulated light, can be used for transmitting information between devices if it is not desirable to have physical connections. Examples are the transmission of data by infrared signals between a movable command unit and a fixed operating unit, or between movable data stations (terminals) and a common switching or port unit of a fixed transmission network.

In such installations, the optical signal propagates freely through the air, and the receivers not only pick up the actual information signal but also ambient light, either daylight or artificial light from lamps. To achieve efficient and error-free transmission, this ambient light should, of course, be suppressed, or separated from the desired signal in the receiver.

PRIOR ART

Known systems for reducing ambient light components are mainly based on filtering techniques. The article, "Infrared Detection System," by A. L. Boynton and R. D. Holmes, published in the IBM Technical Disclosure Bulletin, Vol. 15, No. 5 (October 1972), pp. 1483 and 1484, discloses a system for recovering a weak light signal in a high-ambient light environment for operating a passenger barrier. In this system, the DC ambient component is reduced by optical bandpass filters while the AC component is reduced by electrical filtering. A publication of R. L. Soderstrom, "Ambient Light Rejection for Laser Scanners," IBM Technical Disclosure Bulletin, Vol. 17, No. 12, (May 1975) pp. 3682 and 3683, suggested a specific combination of optical filter and photomultiplier tube for reducing the bandwidth of a detected optical signal in a laser scanner, whereby also the ambient light component of the detected signal is reduced. An article by F. Closs et al, "Wireless Connection Between a Controller and a Plurality of Terminals," which was published in the IBM Technical Disclosure Bulletin, Vol. 20, No. 7 (December 1977), page 2843, generally suggests the use of an optical interference filter for eliminating a large proportion of the ambient light in an infrared signal transmission system.

While the disclosed systems reduce the disturbing ambient light which has a wide spectrum by restricting the received signal to a narrow frequency band, they do not eliminate the ambient light component within that passband. Thus there still remains the problem of distinguishing, within that passband, a possibly weak data signal from a strong ambient component, particularly if there are fast fluctuations, e.g., due to switching of lamps or flashlights.

The publication, "Spectrophotometric Noise Cancellation," by C. A. Pillus and L. D. Thorp, IBM Technical Disclosure Bulletin, Vol. 19, No. 6 (November 1976), pp. 2185 and 2186, suggests compensating the noise of a light source in a spectrophotometer by subtracting an unmodulated reference signal taken from that source, from the modulated signal. Ambient noise, however, cannot be compensated by the disclosed scheme.

OBJECTS AND SUMMARY OF THE INVENTION

It is an object of this invention to provide an arrangement by which ambient light that is received together with an optical signal can be almost completely eliminated, particularly within a narrow passband for the optical signal. It is a further object to provide such an ambient light compensation arrangement which remains effective even when the environment light fluctuates heavily.

This arrangement has the advantage that for moderate requirements a considerable reduction of the ambient light within the signal passband is possible by providing a single interference filter and a few additional inexpensive elements. An almost complete compensation, even for rapidly fluctuating ambient light conditions, can be obtained when filters and photodiodes of higher quality are used. An ambient light compensating arrangement according to the invention can be built in such a compact form that it can be incorporated in hand-held devices, e.g., in a wand scanner in which the light for scanning a document and the reflected light (scan signal) are guided by optical fibers.

DETAILED DESCRIPTION OF THE INVENTION

Principle of the Ambient Light Suppression Device

Figure 1:
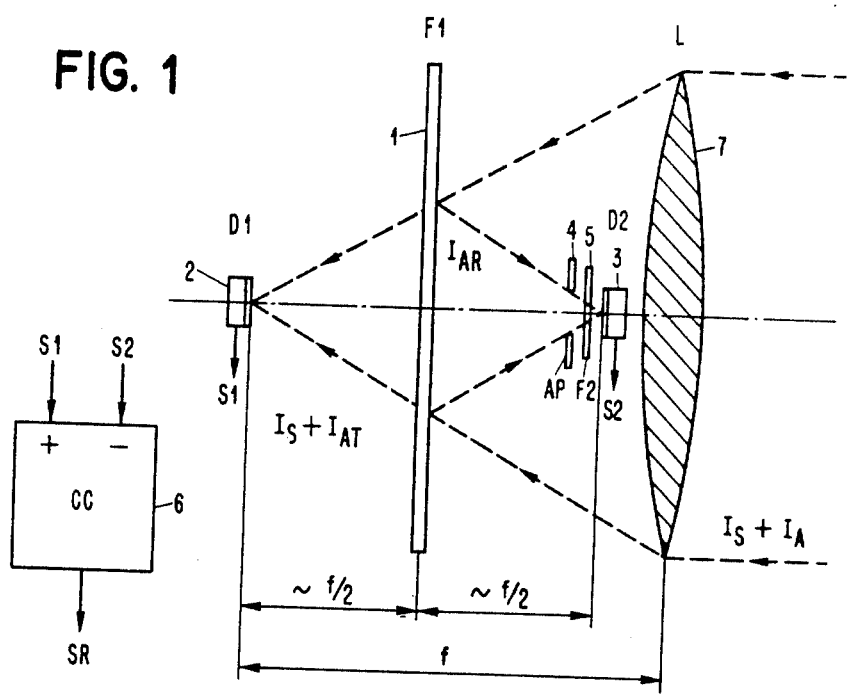
FIG. 1 is a schematic diagram of a typical arrangement of the optical elements in an embodiment of the invention.

A typical arrangement of an ambient light suppression device constructed according to the invention is shown in FIG. 1. The arrangement essentially comprises an interference filter F1 (1), two photo sensitive elements D1 and D2 (2 and 3), adjusting means in the form of a variable aperture AP (4) and a second filter F2 (5), and an electrical compensation circuit CC (6) whose inputs are connected to the outputs of the photo sensitive element, e.g., photodiodes D1 and D2.

Focusing means in the form of a lens L (7) is also shown in the example but need not be provided if the input light for this device is furnished in concentrated form, e.g., by an optical fiber.

Interference filter F1 has a very narrow passband that fits the wavelength of the optical signal $I_s$ which is to be separated from ambient light by this device. For infrared signal transmission, the center frequency of this band is about 900 nm.

Photodiode D1 is located at a focal distance f from lens L, photodiode D2 close to the center of the lens, and interference filter F1 is centrally located between both. Aperture AP and second filter F2 are placed between filter F1 and photodiode D2.

These spatial relations need not be observed when the light is propagated by a waveguide, thus eliminating the need for a lens. In this case, arbitrary distances can be selected, as will be apparent from another embodiment described below.

Figure 2:
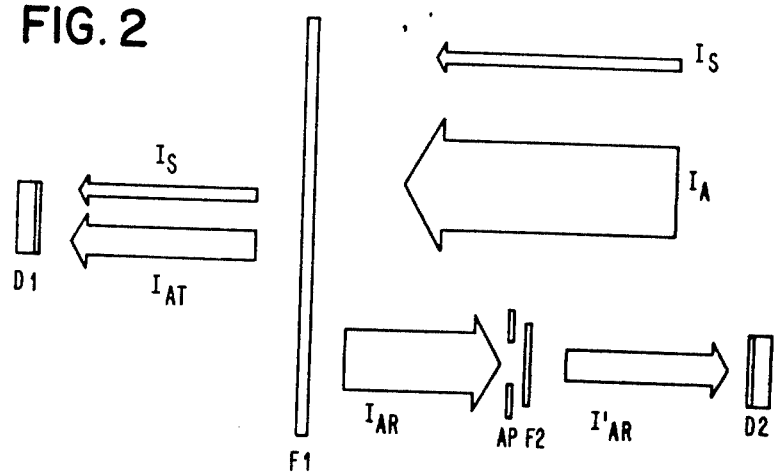
FIG. 2 is a schematic diagram of the original, transmitted, and reflected portions of the optical signal and ambient light for illustrating the function of the optical elements involved.

Operation of the above arrangement is as follows and will be apparent from FIGS. 1 and 2. Optical signal $I_s$ and strong ambient light $I_A$ arrive together at filter F1 from the right. Signal $I_s$ passes F1 to photodiode D1 because its wavelength fits the passband of interference filter F1. The ambient light is split into two portions. A first portion $I_{AT}$ lies in the passband and is transmitted by filter F1 to photodiode D1. This portion would heavily disturb the optical signal if not compensated. Another portion $I_{AR}$ of the ambient light is reflected by filter F1 towards photodiode D2. Due to attenuation and bandwidth limitation by aperture AP and the second filter F2, a reduced portion $I'_{AR}$ of the reflected ambient light will impinge on photodiode D2. Filter F2 and the setting of aperture AP are so selected that ambient light portions $I_{AT}$ and $I'_{AR}$ result in about the same output signal at photodiode D1 and D2, respectively. Intensity variations of the total ambient light $I_A$ will result in proportional variations of the transmitted and reflected portions $I_{AT}$ and $I'_{AR}$.

Electrical output signals S1 and S2 of photodiodes D1 and D2 are subtracted in compensation circuit CC so that the signal portions which are due to the ambient light cancel each other while output signal SR is essentially only dependent on the actual optical signal $I_S$.

The compensation procedure can be formally described as follows:

$$i_1 = S(I_{AT} + I_S)$$

$$i_2 = k \cdot S \cdot I_{AR}$$

$$\Delta i = i_1 - i_2 = S(I_{AT} - kI_{AR}) + SI_S$$

$$= S(\Delta I_{AT} + I_S)$$

In these equations, $i_1$ and $i_2$ are the currents through photodiode D1 and D2, respectively. S is the sensitivity of the photodiodes, and k is an adjustment factor which is determined by the opening of the aperture, by second filter F2, or any other means for adjusting the light level at photodiode D2. With the aid of factor k, the expression $(I_{AT} - k \cdot I_{AR}) = \Delta I_{AT}$ can be minimized.

It is to be noted that shot noise produced in photodiodes D1 and D2 by ambient light portions $I_{AT}$ and $I'_{AR}$ is not compensated, but rapid intensity fluctuations due to switching on/off of lamps and higher harmonics of the main frequency are compensated, even if their electrical frequency components fall within the bandwidth of the electrical output signal representing the data. The achievable degree of compensation depends on the correlation of the intensity fluctuations of the particular ambient light source in the two optical passbands of $I_{AT}$ and $I'_{AR}$.

In a short test procedure before actual operation of the device, the aperture setting can be adjusted (and, if a replaceable second filter F2 is provided, a filter can be selected) so that optimum compensation of ambient light is achieved in the respective environment. Any differences in the characteristics (sensitivity) of photodiodes D1 and D2 can also be compensated this way.

An alternative or additional possibility for adjusting signals in the device can be provided by an adjustable electrical amplifier or attenuator for signal S2 in compensation circuit CC.

Figure 3:
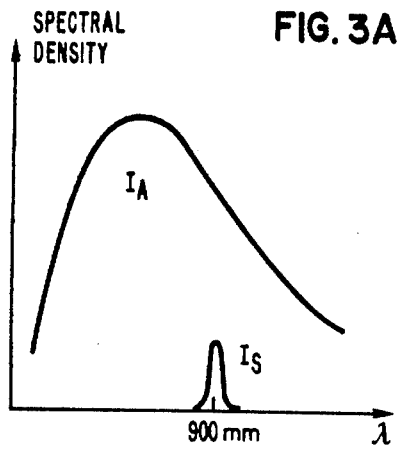
FIGS. 3A–3D are spectral distribution diagrams illustrating the relation between original, transmitted, and reflected portions of ambient light and optical signal.
Figure 3:
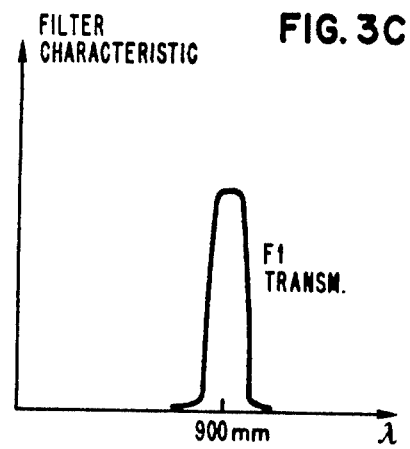
Figure 3:
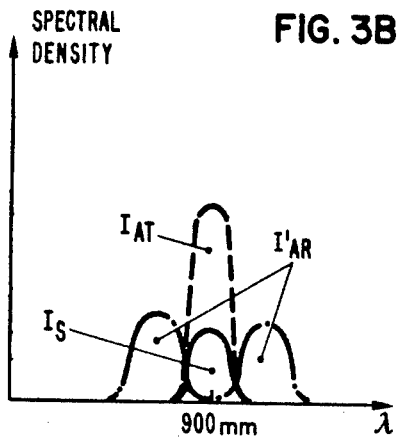
Figure 3:
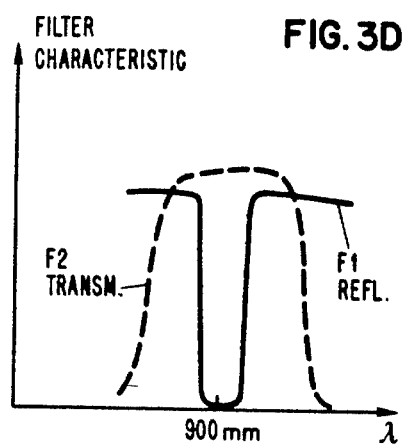

The spectral diagrams and filter characteristics shown in FIG. 3 will further clarify operation of the ambient light compensating arrangement. FIG. 3A shows the relation of the spectral densities of the relatively weak and narrow-band optical signal $I_S$ and of the strong and relatively broad-band ambient light $I_A$. FIG. 3B shows the resulting spectral densities after the light has passed through filter F1 ($I_S$ and $I_{AT}$), or was reflected by filter F1 and has passed through the aperture and filter F2 ($I'_{AR}$). It can be seen that the two lateral spectral bands $I'_{AR}$, adjustable in intensity by the aperture, can be used to compensate the center spectral band $I_{AT}$. It should be noted that the scale of the abscissa is extended in FIG. 3B to show the relationship more clearly.

FIG. 3C shows the filter characteristic of F1, a narrow passband. FIG. 3D shows both the reflection characteristic of interference filter F1 which is the complement of the characteristic in FIG. 3C, and the filter characteristic of F2 (dashed) which represents a broader passband including the narrow passband of F1. While interference filter F1 should be of relatively good quality depending on the degree of compensation required, filter F2 which is only used for rough bandwidth limitation can be a simple and cheap filter of relatively low quality, e.g., a piece of unexposed but developed color film. In this case, the high pass characteristic of the film, together with the low pass characteristic of photodiode D2 will combine to achieve the desired bandpass function. As an alternative, filter F2 could also be an interference filter with a passband having about the same bandwidth as filter F1 but with a shifted center frequency.

As an alternative for the settable aperture AP, a neutral density filter can be provided for adjusting the intensity of the reflected light at photodiode D2.

Electrical Compensation Circuit

Figure 4:
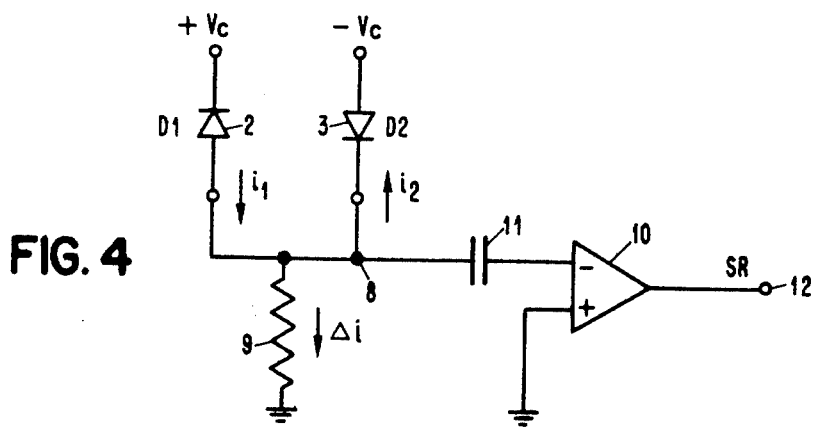
FIG. 4 is a simplified electrical circuit for compensating an ambient light component within the passband.

The principal arrangement of one embodiment of electrical compensation circuit CC(6) is illustrated in FIG. 4. Photodiodes D1 (2) and D2 (3) are connected in opposite relationship to one common point 8 of the circuit, while their other ends are connected to a positive supply voltage $+V_c$ and a negative supply voltage $-V_c$, respectively. Common point 8 is connected to ground through resistor 9 and to one input of a differential amplifier 10 through a capacitor 11. The other input of the differential amplifier is connected to ground. In operation, signals S1 and S2 (FIG. 1), which are represented in FIG. 4 by a positive current $i_1$ and a negative current $i_2$, respectively, are subtracted in resistor 9. Difference current $\Delta i$ and the resulting voltage drop are proportional to the optical signal $I_S$. Thus, signal SR which is available at output 12 of amplifier 10 is proportional to signal $I_S$ and has no component which depends on ambient light.

Automatically Adjusting Compensating Circuit

Figure 5:
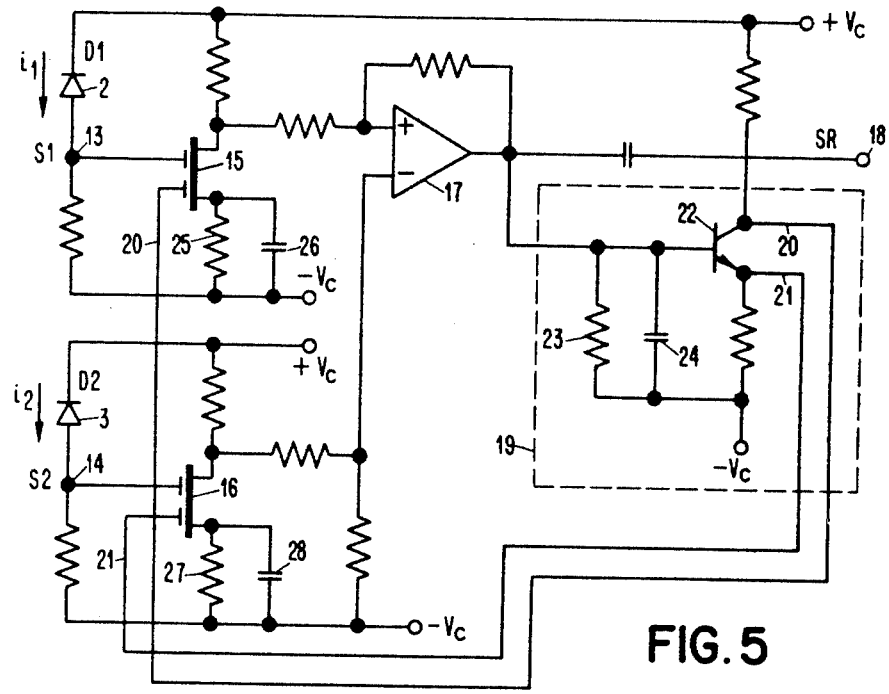
FIG. 5 is another embodiment of the electrical compensation circuit which provides automatic adjusting between the signals representing the transmitted and reflected portions of the ambient light.

In FIG. 5, an alternative embodiment of compensation circuit CC is shown which automatically adjusts to slow (i.e., low-frequency) variations in the ambient light thus providing a means for electronically determining the adjustment factor k mentioned previously.

Photodiodes D1 (2) and D2 (3) are connected to input terminals 13 and 14, respectively. Signals S1 and S2 are transmitted through field-effect transistors 15 and 16, respectively, to the complementary inputs of a differential amplifier 17. The output of this amplifier furnishes the compensated output signal SR at output 18, this signal being independent of ambient light and solely representing the received optical data signal. The two field-effect transistors 15 and 16 are of the type having two gate electrodes. Current through such an FET can be controlled by two different control signals each furnished to one of the two gate electrodes.

Currents of the two field-effect transistors are kept on the average at equal levels by lowpass network 19 which is connected to the output of differential amplifier 17 and which furnishes two feedback signals on lines 20 and 21 to the second gate electrodes of field-effect transistors 15 and 16, respectively. Network 19 comprises a bipolar transistor 22 whose collector is connected through a resistor to a supply voltage $+V_c$ and whose emitter is connected through a resistor to a supply voltage $-V_c$. Its base is connected to the output of differential amplifier 17. Feedback lines 20 and 21 are connected to the collector and emitter, respectively. A parallel combination of a resistor 23 and capacitor 24 is provided between the base and negative supply voltage $-V_c$.

Due to the RC combination, only low frequency components of the output signal of differential amplifier 17 will affect the current through bipolar transistor 22. In operation, feedback signals on lines 20 and 21 tend to control field-effect transistors 15 and 16 in such a way that the low frequency output of the differential amplifier is about zero. Thus, slowly varying differences between components $I_{AT}$ and $I_{AR}$, e.g., due to changes in spectral density are compensated by this adjusting circuitry. This circuitry will also compensate for different areas or sensitivities of the two photodiodes.

RC combinations 25, 26 and 27, 28 are provided between the source electrodes of field-effect transistors 15 and 16, and negative supply voltage $-V_c$, respectively, for stabilizing the working point by inverse DC feedback.

Optical Fiber Embodiment

Figure 6:
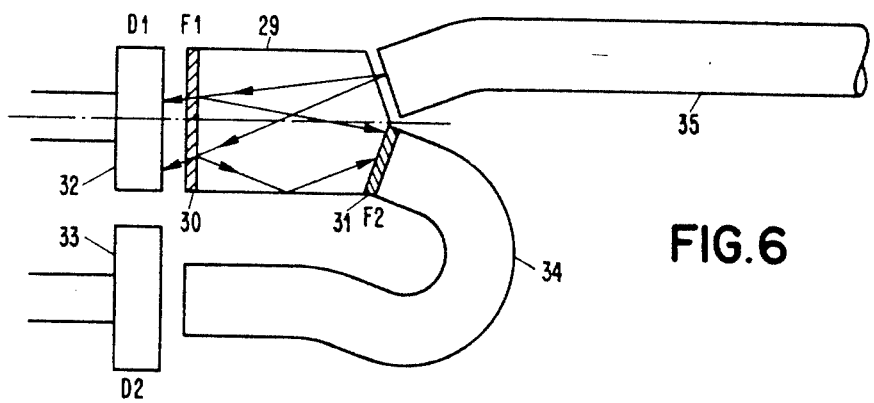
FIG. 6 is an arrangement of the optical elements in an alternative embodiment of the invention which is suitable for optical fiber technology.

An embodiment of the ambient light suppression device operating with optical fibers is shown in FIG. 6. This arrangement comprises a glass rod 29 to which an interference filter 30 (F1) and another filter 31 (F2) are attached. In addition to photodiodes 32 (D1) and 33 (D2) a short optical fiber bundle 34 is provided between filter F2 and photodiode D2. While the one side of the glass rod holding filter F1 has a face that is perpendicular to the glass rod axis, the other side has two faces which are inclined with respect to the glass rod axis. One of these faces supports filter F2 to which the short optical fiber bundle 34 is attached. Another optical fiber bundle 35 is attached to the other face.

This second optical fiber bundle 35 carries the optical signal $I_S$ and an ambient light component $I_A$ which was picked up at a point or in a section of the transmission path where the optical signal $I_S$ propagated not through a fiber but unrestricted through the air. Optical signal and ambient light will propagate through glass rod 29 to interference filter F1 which here has the same effect as explained in connection with FIG. 1. While optical signal $I_S$ and ambient light portion $I_{AT}$ are transmitted through the filter to photodiode D1, another portion $I_{AR}$ of the ambient light is reflected by filter F1. Because the two faces on the other side of the glass rod include equal inclination angles with the glass rod axis, the reflected light will impinge onto the face carrying filter F2. Filtered portion $I'_{AR}$ of the ambient light propagates through optical fiber bundle 34 to photodiode D2.

Filter F2 could also be placed between photodiode 33 (D2) and fiber bundle 34. In this case, an unexposed, developed color film (as explained above) or a filter evaporated on a separate glass plate can be used. An attenuation element can also be inserted between photodiode D2 and fiber bundle 34. Alternatively, the distance (air gap) or the axial alignment between both can be made adjustable.

Figure 7:
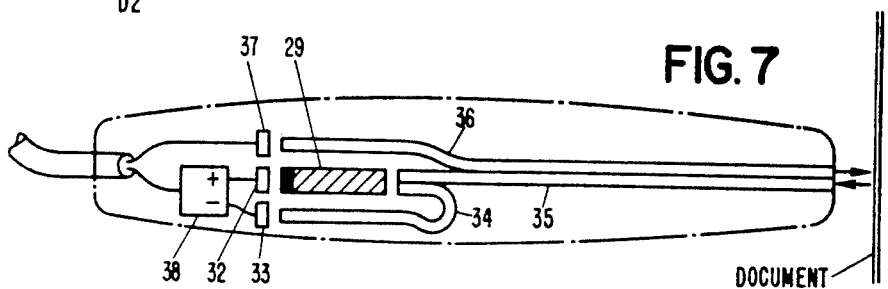
FIG. 7 is a schematic illustration of a wand scanner incorporating an arrangement similar to that of FIG. 6.

This whole arrangement could, for example, be placed in a hand-held wand which is used for price tag scanning, as is schematically shown in FIG. 7. An additional optical fiber bundle 36 plus an LED or laser 37 at one end is used for illumination, while optical fiber bundle 35 picks up the reflected light from the price tag, plus ambient light. Electrical compensation circuitry 38 which is to be connected to photodiodes D1 and D2 (32 and 33) can also be incorporated in the hand-held wand which thus constitutes a completely self-contained scanning device which includes ambient-light suppression.

Results

An apparatus has been described by which ambient light can efficiently be eliminated from an optical data signal. Contrary to compensating methods known so far, the present invention allows a reduction of the ambient light component particularly within the narrow frequency band of the optical data signal.

It is most suited for elimination of disturbances due to rapid fluctuations of environment illumination, e.g., switching of lamps or flashlights, and is particularly useful for optical transmission systems in which the data to be transmitted have a low baseband rate, or which have an FM carrier frequency less than 100 kHZ.

Tests that were made with an arrangement comprising two interference filters F1 and F2 of different center frequencies showed that the following ambient light reductions $R = \Delta I_{AT}/I_{AT}$ can be expected (cf. page 7 for definition of $\Delta I_{AT}$). For incandescent lamps: $R = 1:740$, for fluorescent lamps: $R = 1:40$, and for flashlights (peak suppression): $R = 1:32$.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. An arrangement for separating an optical signal of a given wavelength from ambient light, comprising an optical interference filter having a relatively narrow passband substantially centered at the said given wavelength of said optical signal, characterized by first and second photodetector means (2,3) so arranged that the first (2) receives light waves in a substantially narrow band transmitted through said interference filter (1) and that the second receives light waves reflected by said interference filter, and circuit means (6, FIG. 1; FIG. 4; FIG. 5) for generating a difference signal (SR) from the output signals (S1, S2) of said first and second photodetector means, and means (4, 5, FIG. 1; 19, FIG. 5) for adjusting the relation between the output signals furnished by the said first and second photodetector means.

2. An arrangement according to claim 1, characterized in that said adjusting means comprise an adjustable aperture (4) for passing a selectable portion of said reflected light ($I_{AR}$) to said second photodetector means (3).

3. An arrangement according to claim 1 or 2, characterized in that said adjusting means comprise a second optical filter (5) having a passband in the vicinity of said interference filter's (1) passband.

4. An arrangement according to claim 1 or 2, characterized in that said adjusting means include a second optical filter (5) which in combination with said second photodetector means (3) has a passband in the vicinity of said interference filter's (1) passband.

5. An arrangement according to claim 1 or 2, characterized in that in the optical path between said interference filter (1) and said second photodetector means (3) includes a second optical filter (5) in the form of an unexposed developed color film.

6. An arrangement according to claim 1, characterized in that it comprises focusing means (7) for the optical signal ($I_S$) and the ambient light ($I_A$), said first (2) and second (3) photodetector means and said interference filter (1) being so arranged with respect to the focusing means that light waves transmitted by said interference filter are focused on said first photodetector means (2), and light waves reflected by said interference filter are focused on said second photodetector means (3).

7. An arrangement according to claim 1, characterized in that it comprises:
a block (29) of transparent material having a first face on one side and a second and third face opposite said first face, said interference filter (30) being arranged at said first face,
first optical fiber bundle means (35) being arranged for guiding said optical signal and ambient light to said second face,
second optical fiber bundle means (34) one end of which is arranged at said third face for receiving light from it;
said first photodetector means (32) being arranged close to said interference filter, and said second photodetector means (33) being arranged at the other end of said second optical fiber bundle means, and
said block of transparent material guiding light beams from said first optical fiber bundle means to said interference filter, and
guiding light beams reflected by said interference filter to said second optical fiber bundle means.

8. An arrangement according to claim 1, characterized in that said circuit means (FIG. 5) for generating said difference signal (SR) comprise compensating circuitry (19) which removes the low frequency components of said output signals (S1, S2) from said photodetector means (2, 3).

* * * * *